Patented Dec. 3, 1935

2,022,676

UNITED STATES PATENT OFFICE 2,022,676

COMPOSITION OF MATTER COMPRISING AMMONIA, UREA, AND POTASSIUM SALTS, ITS PREPARATION AND USE IN MAKING FERTILIZERS

Walter H. Kniskern, Prince George County, Va., and Charles K. Lawrence, Syracuse, N. Y., assignors to Atmospheric Nitrogen Corporation, New York, N. Y., a corporation of New York No Drawing. Application January 21, 1933, Serial No. 652,925

12 Claims. (Cl. 71—9)

This application is related to our copending United States application, Serial No. 652,922, filed January 21, 1933. In said copending application, we have described new compositions, useful in the production of fertilizers, containing ammonia, urea and other materials such as ammonium chloride, ammonium sulfate, ammonium nitrate, sodium nitrate, potassium nitrate and potassium chloride. The invention of this application particularly relates to new compositions of matter comprising urea, ammonia and a potassium salt. Examples of such potassium salts are potassium nitrate and potassium chloride. This invention further relates to processes for the preparation of the aforesaid compositions, to methods for the transportation of urea, ammonia and said potassium salts and to the production of fertilizers containing urea, ammoniacal nitrogen and potash. This invention likewise relates to methods of preparing liquid compositions containing relatively high proportions of solid fertilizer materials, urea and ammonia and to a transportable package containing a liquid composition comprising urea, ammonia and a potassium salt.

The methods for the fixation of atmospheric nitrogen recently developed make available from this source large amounts of ammonia for industrial purposes and particularly for the production of fertilizers. In the ammonia synthesis process for the production of fixed nitrogen in which hydrogen is obtained from water gas or similar gases containing compounds of carbon, large amounts of carbon dioxide are separated from the gas as a by-product in the preparation of the hydrogen-nitrogen gas mixture required for the synthesis of ammonia. This carbon dioxide may be utilized by combining it with the ammonia to form urea. There is, therefore, available at synthetic ammonia plants ammonia and urea, both of which are of value in the production of mixed fertilizers including an acidic constituent such as superphosphate or triple superphosphate. Nitrogen, phosphorus and potassium are considered as the three fertilizer constituents primarily necessary for plant growth which should be supplied to the soil. It is desirable, therefore, in preparing mixed fertilizers from a superphosphate, to add to the superphosphate both nitrogen and potassium containing materials.

While the nitrogen fixation industry makes available large quantities of nitrogenous materials as ammonia and urea, the marketing of these separate products is, however, attended by difficulties and expensive operations. The ammonia may be obtained either in the form of liquid ammonia or of aqua ammonia. The liquid ammonia has relatively high vapor pressures at ordinary temperatures and the aqua ammonia contains a considerable proportion of water, both of which factors make the transportation of large quantities of ammonia difficult and expensive. With respect to the urea, this material is produced in aqueous solution or as a slurry and, in order to obtain it as the solid, it must be dried, which increases the cost of the final product.

It is desirable to prepare at the nitrogen fixation plants and ship to the makers of mixed fertilizers a nitrogen containing composition which also contains potash. By addition of such a composition to a superphosphate, a mixed fertilizer containing all three of the desired elements for plant growth may be directly prepared.

It is accordingly an object of this invention to provide compositions of matter comprising nitrogen-containing products readily available at synthetic ammonia plants and potassium salts, which compositions may be conveniently transported as liquids of low vapor pressure containing a relatively high percentage of valuable fertilizer constituents. It is further an object of this invention to provide a process for the economical preparation for transportation of urea, ammonia and potassium salts, such as potassium nitrate or potassium chloride, in the form of liquid compositions containing these valuable ingredients. Another object of the invention is to provide a process for the production of fertilizers which may contain a relatively high proportion of nitrogen by treating a monocalcium acid phosphate material, for example, superphosphate, triple superphosphate or mixtures containing the same, with a liquid composition comprising urea, ammonia and one or more potassium salts.

We have discovered that the solubility of urea in ammoniacal liquids may be modified by dissolving potassium nitrate in the liquid. Thus, we have found that whereas a solution of urea in anhydrous liquid ammonia containing about 0.49 part of urea for every 1 part of ammonia salts out at 0° C., if to this urea-ammonia solution potassium nitrate is added, the solubility of the urea is increased so that a solution of urea and potassium nitrate in liquid anhydrous ammonia may be prepared containing 0.59 part of urea and 0.1 part of potassium nitrate for every 1 part of ammonia which does not salt out at temperatures above 0° C. A solution of urea and potassium nitrate in anhydrous liquid ammonia may also be prepared containing 0.77 part of urea and 0.27 part of potassium nitrate for every 1 part of ammonia, which solution does not salt out at temperatures above about 7° C.

Not only does the presence of the potassium nitrate increase the solubility of the urea, but we have discovered that the converse relationship holds true; i. e., that by dissolving urea in solutions of potassium nitrate in ammoniacal liquors the solubility of this salt may be increased.

Thus, for example, a solution of potassium nitrate in anhydrous liquid ammonia saturated at 0° C. contains about 0.1 part of potassium nitrate for every 1 part of ammonia. If, however, urea is dissolved in this solution of potassium nitrate, the solubility of the potassium nitrate is increased so that a solution in anhydrous liquid ammonia may be prepared containing about 0.46 part of urea and about 0.24 part of potassium nitrate for every 1 part of ammonia, which does not salt out at temperatures above about 0° C.

We have likewise discovered that in ammoniacal solutions of urea and potassium chloride, the presence of the urea increases the solubility of the potassium chloride. For example, a solution of potassium chloride in 50% aqua ammonia (an aqueous solution of ammonia containing 50% $NH_3$) containing no urea and 0.08 part of potassium chloride for every 1 part of ammonia, salts out at 0° C. By dissolving urea and potassium chloride in 50% aqua ammonia, solutions containing about .18 to .19 part of potassium chloride and 0.94 to 1.40 parts of urea may be prepared, which do not salt out at temperatures above 0° C. Similarly, whereas a solution in 30% aqua ammonia of potassium chloride, containing 0.25 part of potassium chloride for every one part of ammonia, salts out at 0° C., a solution in 30% aqua ammonia of 0.42 part of potassium chloride and 1.61 parts of urea may be prepared, which does not salt out at temperatures above 0° C.

Solutions of urea and potassium salts in ammoniacal liquids other than those described above, may be prepared and utilized in accordance with this invention. For example, a solution of urea and potassium nitrate in 50% aqua ammonia containing 1.39 parts urea and 0.18 part potassium nitrate for every 1 part of ammonia may be prepared. Such a solution does not salt out at temperatures above 5° C.

These phenomena discovered by us of the influence of urea and potassium salts upon the solubility of each other in ammoniacal solutions either in anhydrous liquid ammonia or in aqua ammonia are of important practical value since they make available compositions which retain their fluid state at ordinary atmospheric temperatures and contain a high proportion of valuable fertilizer constituents. Furthermore, these solutions do not present serious difficulties due to the separation of solid from the liquid under ordinary conditions. Any solid material which may, under certain circumstances, separate out from the solutions may be redissolved by a slight warming of the solution. These highly concentrated solutions may, therefore, be economically utilized for the transportation of fixed ammonia. They are of practical value in the preparation of fertilizers by addition to acidic materials, for example, to superphosphate. Since they may contain but a relatively small amount of water, they permit the direct production of commercially dry granular fertilizer products by adding the solutions to superphosphate. They permit the production of phosphate fertilizers containing a high proportion of plant food. Since they contain a large proportion of total nitrogen for a given amount of alkaline ammonia, the addition of these solutions to a superphosphate in amount such that the alkaline ammonia does not cause excessive reversion of available $P_2O_5$ in the superphosphate imparts to the resulting fertilizer a high nitrogen content and a proportion of desirable potash. The fertilizers thus prepared are in excellent physical condition.

An important characteristic of the solutions of this invention is their lower vapor pressures than the vapor pressures of liquid ammonia or of aqua ammonia of a corresponding concentration. Liquid anhydrous ammonia has vapor pressures which range from 4.2 atmospheres absolute at 0° C. to 11.5 atmospheres absolute at 30° C. A solution of urea and potassium nitrate in anhydrous liquid ammonia containing about 27 parts of urea, about 14.5 parts of potassium nitrate and about 58.5 parts of ammonia has a vapor pressure at 0° C. of about 3.7 atmospheres absolute and at 30° C. a vapor pressure of about 10.1 atmospheres absolute. A solution of potassium nitrate and urea in 50% aqua ammonia containing about 27 parts of urea, 5 parts of potassium nitrate, 34 parts of ammonia and 34 parts of water has a vapor pressure at 0° C. of 0.9 atmosphere absolute and at 30° of 2.9 atmospheres absolute.

Solutions of urea and potassium nitrate or potassium chloride in anhydrous liquid ammonia or aqueous ammoniacal compositions containing these materials, which are substantially saturated with solid components at temperatures between about −30° C. and 30° C., and particularly at about 0° C., are advantageous from the viewpoint of their transportation and use in the treatment of superphosphate for the production of fertilizers due to their relatively low vapor pressures and relatively large amounts of desirable non-basic fertilizer materials contained in the solutions.

The ammoniacal solutions of urea and potassium salts of this invention may be readily transported in a transportable package comprising a container and the liquid composition. Due to the material lowering of the vapor pressures of ammoniacal liquids by dissolving urea and potassium salts therein, the containers in which the liquids are shipped are not subjected to the relatively high vapor pressures of liquid or aqua ammonia of corresponding concentrations without the urea and potassium salt being present. In many cases the vapor pressure of ammoniacal liquids at ordinary atmospheric temperatures which, without urea and potassium salts being dissolved therein are materially above atmospheric, may be lowered to about atmospheric at those temperatures by the addition of urea and potassium salts so as to permit its transportation and handling in low pressure containers, whereas the ammoniacal liquid itself would require special equipment for its transportation. It is of advantage to dissolve in the ammoniacal liquids having vapor pressures materially above atmospheric pressure at ordinary temperatures, urea and a potassium salt in amount at least sufficient to lower the vapor pressure of the ammoniacal liquid to about atmospheric at ordinary atmospheric temperatures.

Urea, potassium nitrate and potassium chloride may be prepared for transportation and/or use in the preparation of fertilizers in the form of liquid compositions of this invention by admixing dry solid urea and the potassium salt with either liquid or gaseous anhydrous ammonia or with aqua ammonia. Gaseous anhydrous ammonia may be absorbed by the solids to form a liquid product. One of the solids may be added to a solution or slurry of the other in liquid or aqua ammonia. In preparing aqueous compositions, water solutions or slurries containing urea and potassium nitrate or chloride may be treated with anhydrous or aqua ammonia or gaseous ammonia may be absorbed in the solution or slurry. In general, the compositions may be prepared by admixing the desired proportions of the urea, ammonia and potassium salt, with or without water, any one or more of which may contain proportions of the other components.

The following examples are illustrative of methods of preparing the solutions of this invention. The proportions of materials used are given in parts by weight:

*Example I.*—A substantially anhydrous liquid composition containing urea, potassium nitrate and ammonia may be prepared as follows: About 37 parts of dry solid urea is mixed with about 63 parts of liquid anhydrous ammonia. A slurry is formed which at 0° C. would contain about 9 parts of undissolved solid $CO(NH_2)_2 \cdot NH_3$. About 6½ parts of dry solid potassium nitrate are added to 100 parts of the foregoing urea-ammonia mixture and these materials form a solution which does not salt out at about 0° C. or above. At 30° C. the solution has a vapor pressure of about 10 atmospheres absolute which is approximately the vapor pressure of an 88% aqua ammonia at this temperature.

*Example II.*—About 19 parts of dry potassium nitrate are mixed with about 81 parts of liquid anhydrous ammonia. At 0° C., for example, this mixture would form a slurry containing about 11 parts of undissolved potassium nitrate. About 37 parts of urea are added to 100 parts of the potassium nitrate-ammonia mixture and a solution is thus obtained which does not salt out at 0° C. or above. At 30° C. this solution has a vapor pressure of about 10 atmospheres absolute.

*Example III.*—A composition containing urea, potassium nitrate, ammonia and water may be prepared by mixing the following materials: (a) 41½ parts of a urea-water composition containing about 32 parts of urea such as may be obtained from the synthesis of urea from ammonia and carbon dioxide; (b) about 36½ parts of a solution of about 6 parts of potassium nitrate in water; and (c) about 40 parts of anhydrous ammonia. The liquid composition formed by mixing the above ingredients does not salt out at temperatures above —3° C. and has, at 30° C. a vapor pressure of about 2.9 atmospheres absolute, approximately equal to the vapor pressure of 46% aqua ammonia at this temperature.

A fertilizer may be prepared by mixing about 120 parts of the above described liquid composition with a mixture of the following materials:

|  | Parts |
|---|---|
| Superphosphate | 890 |
| Ammonium sulfate | 152 |
| Muriate of potash | 155 |
| Inert filler | 685 |

The resulting fertilizer mixture is in good physical condition both immediately after ammoniation and also after cooling. It contains about 4% N, 8% $P_2O_5$ and 4% $K_2O$.

*Example IV.*—About 10 parts of potassium nitrate and 18½ parts of urea are dissolved in about 40 parts of liquid anhydrous ammonia forming a solution which does not salt out at temperatures above about 3° C. About 68½ parts of this solution are then admixed with the following ingredients:

|  | Parts |
|---|---|
| Superphosphate | 890 |
| Ammonium sulfate | 180 |
| Potassium sulfate | 150 |
| Sand | 710 |

The resulting fertilizer product is in good physical condition immediately after ammoniation and also after cooling. It contains about 4% N, 8% $P_2O_5$ and 4% $K_2O$.

*Example V.*—About 30 parts of urea and about 7½ parts of potassium chloride are dissolved in 62 parts or 30% aqua ammonia. The resulting solution does not salt out at 0° C. and above. It may be utilized for the preparation of a fertilizer by mixing about 145 parts of the solution with the following materials: about 890 parts of superphosphate, about 177 parts of ammonium sulfate, about 146 parts of muriate of potash and about 642 parts of inert filler.

While the above examples are given as illustrative of this invention, numerous modifications and changes may be made in the particular compositions disclosed and methods of employing them in the production of fertilizers. If desired, solutions may be prepared containing ammonia, urea and a plurality of potassium salts. Further, additional materials, such as ammonium phosphate, nitrate, sulfate or chloride, sodium nitrate, calcium nitrate, etc. or any two or more of these materials which in themselves are valuable fertilizers, may be incorporated with the ammoniacal solutions of urea and potassium salt before they are added to the phosphate material or they may be incorporated with the phosphate material before, after or simultaneously with the urea-ammonia containing compositions.

When in this specification or in the appended claims reference is made to a solution saturated with the solid components at a given temperature, it is intended to refer to an ammoniacal solution which contains an amount of urea and potassium salt such that it does not salt out a solid phase containing one or more of the dissolved ingredients at the given temperature but which, upon cooling to a lower temperature, deposits a solid comprising urea and/or a potassium salt, or a complex compound containing two or more ingredients of the solution, particularly compounds of ammonia and one or more of the solid ingredients.

We claim:

1. As a new composition of matter, a liquid comprising urea, a potassium salt and a substantial proportion of ammonia, said liquid containing an amount of at least one of said urea and salt dissolved therein in excess of that necessary for saturation of the liquid in the absence of the other.

2. As a new composition of matter, a liquid comprising urea, potassium nitrate and a substantial proportion of ammonia, said liquid containing an amount of at least one of said urea and potassium nitrate dissolved therein in excess of that necessary for saturation of the liquid in the absence of the other.

3. As a new composition of matter, a liquid comprising urea, potassium chloride and a substantial proportion of ammonia, said liquid containing an amount of at least one of the said urea and potassium chloride dissolved therein in excess of that necessary for saturation of the liquid in the absence of the other.

4. As a new composition of matter, a liquid comprising urea, a potassium salt and ammonia and substantially saturated with at least one of said urea and potassium salt at a temperature between about −30° C. and 30° C.

5. A process for the preparation for transportation of urea and ammonia which comprises dissolving both urea and a potassium salt in an ammoniacal liquor containing a substantial proportion of ammonia, said materials being employed in proportions such that the resulting liquid composition contains an amount of at least one of said urea and salt in excess of that necessary for saturation of the ammoniacal liquid in the absence of the other.

6. A process for the preparation for transportation of urea and ammonia which comprises dissolving both urea and potassium nitrate in an ammoniacal liquor containing a substantial proportion of ammonia, said materials being employed in proportions such that the resulting liquid composition contains an amount of at least one of said urea and potassium nitrate in excess of that necessary for saturation of the ammoniacal liquid in the absence of the other.

7. A process for the preparation for transportation of urea and ammonia which comprises dissolving both urea and potassium chloride in an ammoniacal liquor containing a substantial proportion of ammonia, said materials being employed in proportions such that the resulting liquid composition contains an amount of at least one of said urea and potassium chloride in excess of that necessary for saturation of the ammoniacal liquid in the absence of the other.

8. A process for producing a fertilizer which comprises treating a solid acidic fertilizer material with a solution of a potassium salt and urea in an ammoniacal liquid containing a substantial proportion of ammonia, said solution containing an amount of at least one of said potassium salt and urea dissolved therein in excess of that necessary for saturation of the ammoniacal liquid in the absence of the other.

9. A process for producing a fertilizer which comprises treating a superphosphate material with a solution of a potassium salt and urea in an ammoniacal liquid containing a substantial proportion of ammonia, said solution containing an amount of at least one of the said potassium salt and urea dissolved therein in excess of that necessary for saturation of the ammoniacal liquid in the absence of the other.

10. A process for producing a fertilizer which comprises adding to and mixing with a monocalcium acid phosphate material a solution of both urea and a potassium salt in an ammoniacal liquor containing a substantial proportion of ammonia, said solution prior to addition to said phosphate material being substantially saturated with at least one of said urea and salt at a temperature between about −30° C. and 30° C.

11. A process for producing a fertilizer which comprises treating a superphosphate material with a solution of potassium nitrate and of urea in an ammoniacal liquid containing an amount of at least one of said urea and potassium nitrate dissolved therein in excess of that soluble in the ammoniacal liquid in the absence of the other.

12. A process for producing a fertilizer which comprises treating a superphosphate material with a solution of potassium chloride and of urea in an ammoniacal liquid containing an amount of at least one of said urea and potassium chloride dissolved therein in excess of that soluble in the ammoniacal liquid in the absence of the other.

WALTER H. KNISKERN.
CHARLES K. LAWRENCE.